United States Patent
Sengupta et al.

(10) Patent No.: US 12,101,279 B2
(45) Date of Patent: Sep. 24, 2024

(54) DYNAMIC GOAL-ORIENTED DIALOGUE WITH VIRTUAL AGENTS

(71) Applicant: Accenture Global Solutions Limited, Dublin (IE)

(72) Inventors: Shubhashis Sengupta, Bangalore (IN); Anutosh Maitra, Bangalore (IN); Roshni Ramesh Ramnani, Bangalore (IN); Sriparna Saha, Patna (IN); Abhisek Tiwari, Patna (IN); Pushpak Bhattacharyya, Bihta (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 389 days.

(21) Appl. No.: 17/459,888

(22) Filed: Aug. 27, 2021

(65) Prior Publication Data

US 2023/0063131 A1 Mar. 2, 2023

(51) Int. Cl.
*H04L 51/02* (2022.01)
*G06F 40/279* (2020.01)
*G06F 40/35* (2020.01)
*G06N 20/00* (2019.01)

(52) U.S. Cl.
CPC ............ *H04L 51/02* (2013.01); *G06F 40/279* (2020.01); *G06F 40/35* (2020.01); *G06N 20/00* (2019.01)

(58) Field of Classification Search
CPC ....... H04L 51/02; G06F 40/279; G06F 40/35; G06N 20/00; G06N 3/045; G06N 3/09; G06N 7/01; G06N 3/006; G06N 3/092
See application file for complete search history.

(56) References Cited

U.S. PATENT DOCUMENTS

| | | | |
|---|---|---|---|
| 2011/0060587 A1* | 3/2011 | Phillips | G10L 15/30 704/235 |
| 2018/0218080 A1* | 8/2018 | Krishnamurthy | G06F 16/9535 |
| 2020/0341976 A1* | 10/2020 | Aggarwal | G06Q 10/10 |
| 2021/0158203 A1* | 5/2021 | Ganti | G06N 3/08 |
| 2021/0288927 A1* | 9/2021 | Wang | G06K 7/1417 |
| 2021/0375272 A1* | 12/2021 | Madwed | G06F 3/167 |
| 2022/0100756 A1* | 3/2022 | Bodigutla | G06F 16/248 |
| 2022/0108080 A1* | 4/2022 | Munavalli | G06N 3/08 |

(Continued)

OTHER PUBLICATIONS

Abhisek Tiwari et al., "A dynamic goal adapted task oriented dialogue agent" (2021) https://journals.plos.org/plosone/article/authors?id=10.1371/journal.pone.0249030 [retrieved Jan. 12, 2022].

(Continued)

*Primary Examiner* — Michael Colucci

(57) ABSTRACT

Systems and methods that offer significant improvements to current virtual agent (VA) conversational experiences are disclosed. The proposed systems and methods are configured to manage conversations in real-time with human customers while accommodating a dynamic goal. The VA includes a goal-driven module with a reinforcement learning-based dialogue manager. The VA is an interactive tool that utilizes both task-specific rewards and sentiment-based rewards to respond to a dynamic goal. The VA is capable of handling dynamic goals with a significantly high success rate. As the system is trained primarily with a user simulator, it can be readily extended for applications across other domains.

20 Claims, 15 Drawing Sheets

(56) References Cited

U.S. PATENT DOCUMENTS

| | | | | |
|---|---|---|---|---|
| 2022/0164225 A1* | 5/2022 | Knight | .................... | G10L 15/22 |
| 2022/0383182 A1* | 12/2022 | Harris | .................... | G06N 3/006 |
| 2022/0395975 A1* | 12/2022 | Cachet | .................. | G06N 3/084 |

OTHER PUBLICATIONS

Hausknecht, Matthew, and Peter Stone. "Deep recurrent q-learning for partially observable mdps." AAAI Fall Symposium Series. 2015.

Ben G. Weber, Michael Mateas, and Arnav Jhala. "Applying Goal-Driven Autonomy to StarCraft.", Proceedings of the Sixth AAAI Conference on Artificial Intelligence and Interactive Digital Entertainment, AAAI 2010.

Wang, Xuewei, Weiyan Shi, Richard Kim, Yoojung Oh, Sijia Yang, Jingwen Zhang, and Zhou Yu. "Persuasion for Good: Towards a Personalized Persuasive Dialogue System for Social Good.", ACL 2019.

Budzianowski, Pawel, Tsung-Hsien Wen, Bo-Hsiang Tseng, Inigo Casanueva, Stefan Ultes, Osman Ramadan, and Milica Gašić. "Multiwoz-a large-scale multi-domain wizard-of-oz dataset for task-oriented dialogue modelling." arXiv preprint arXiv:1810.00278, 2018.

Shi, Weiyan, and Zhou Yu. "Sentiment adaptive end-to-end dialog systems.", Proceedings of the 56th Annual Meeting of the Association for Computational Linguistics (vol. 1: Long Papers 2018.

Bordes, Antoine, Y-Lan Boureau, and Jason Weston. "Learning End-to-End Goal-Oriented dialog." arXiv preprint arXiv:1605.07683 2016.

Williams JD, Young S. Scaling POMDPs for spoken dialog management. IEEE Transactions on Audio, Speech, and Language Processing. 2007; 15(7):2116-2129. https://doi.org/10.1109/T ASL. 2007. 902050.

Li X, Lipton ZC, Dhingra B, Li L, Gao J, Chen YN. A user simulator for task-completion dialogues. arXiv preprint arXiv:161205688. 2016.

Sun K, Chen L, Zhu S, Yu K. A generalized rule based tracker for dialogue state tracking. In: 2014 IEEE Spoken Language Technology Workshop (SLT). IEEE; 2014. p. 330-335.

Hester T, Vecerik M, Pietquin O, Lanctot M, Schaul T, Piot B, et al. Deep q-learning from demonstrations. In: Thirty-Second AAAI Conference on Artificial Intelligence; 2018.

Konda VR, Tsitsiklis JN. Actor-critic algorithms. In: Advances in neural information processing systems; 2000. p. 1008-1014.

Mnih V, Kavukcuoglu K, Silver D, Rusu AA, Veness J, Bellemare MG, et al. Human-level control through deep reinforcement learning. nature. 2015; 518(7540):529-533. https://doi.org/10.1038/nature14236 PMID: 25719670.

\* cited by examiner

1: Input: User actions ($\mathcal{U}_{[1:t]}$), Agent's previous actions ($A_{[1:t-1]}$)

2: Initialize: Training episodes, Hyper Parameters, TrainingFreq, Previous State $s$ with $\mathcal{U}_{[1:t-1]}$, $A_{[1:t-1]}$, Experience Replay Memory(M) with WarmUp Transitions through Rule based Agent, Deep Q-Network ($D^\theta$) with experience replay memory M, Q state action function (Q(S,a)) with random weight $\theta$, Target Q state action function $\left(\hat{Q}(S,a)\right)$ with $\hat{\theta} = \theta$ 3: Output: Agent action ($A_t$) = $\text{argmax}_a \Pi^*_{DQN}(A|S,g)$ ▷ $\Pi^*$: Optimal Policy

DQN ($\pi_{DQN}$)

repeat

R until

FIG. 7A

4: ;
eset environment, Dialogue state (S), GDM State (GS), done = false repeat repeat g until

5: ;

= GDM($U_t$, s, $S_{t-1}$)  ▷ s: user sentiment, g: GDM Status

6: S = getstate($U_t$, s, $S_{t-1}$)  ▷ S: Current State

7: a = $\text{argmax}_a \pi_{DQN/\theta}$(A| S, g)  ▷ A: Action Space

8: user action, reward = user(a)  ▷ reward = TR + SR

FIG. 7B

9: $done = \begin{cases} 1, if\ a\ is\ the\ terminal\ action \\ 0, otherwise \end{cases}$ 10: S' = UpdateState(S, a, user action, reward, done)        ▷ S': Next State 11: Append the experience tuple (S, a, S' reward, done) to the experience replay memory(M)

12: S = S'

13: done

14: if(TrainingEpisode% TrainFreq)

15:    E = Sample random mini-batch of experiences from M        ▷ $E_j$ = (State, action, NextState, reward, done)

FIG. 7C

16: $target_i = \begin{cases} reward_i, & if\ done_i = 1 \\ reward_i + \gamma * max_{a'} \hat{Q}(NextState_i, a') & Otherwise \end{cases}$ $\gamma$: Discount factor 17: $\theta_{k+1} = \theta_k - \alpha * [(Q(State_i, action) - target_i)^2]$ ▷ $\alpha$: Learning rate 18: $\hat{\theta} = \theta$ 19: convergence ▷ Number of training episodes

FIG. 7D

ACM ($\pi_{ACM}$)

1: Input: User actions($U_{[1,t]}$), Agent's previous actions ($A_{[1,t-1]}$)

2: Initialize: Training episodes, Hyper Parameters, TrainingFreq, Previous State $s$ with $U_{[1,t-1]}$, $A_{[1,t-1]}$; Actor Network (AC$^\theta$), Critic Network (AC$^\varphi$), Q state action function (Q(S,a)) with random weight $\theta$, State value function (CriticValue(S)) with random weight $\varphi$ 3: Output: Agent action $(A_t) = argmax_a \pi^*_{AC}(A|S,g)$  ▷ $\Pi^*$: Optimal Policy repeat

R until

FIG. 7E

4: :
eset environment, Dialogue state (S), GDM State (GS), done = false repeat g until

5: :

= GDM($U_t$, s, $S_{t-1}$)   ▷ g: GDM Signal

6: S = getstate($U_t$, s,$S_{t-1}$)   ▷ S: Current State

7: a = $\text{argmax}_a \pi_{AC,d}(A \mid S, g)$   ▷ A: Action Space

8: user action, reward = user(a)   ▷ reward = TR + SR

9: $done = \begin{cases} 1, \text{if } a \text{ is the terminal action} \\ 0, otherwise \end{cases}$

FIG. 7F

10: $S'$ = UpdateState($S$, $a$, user action, reward, done)  ▷ $S'$: Next State

11: $\delta$ = [reward($S$, $a$) + $\gamma$ * CriticValue$_\varphi$($S'$)] − CriticValue$_\varphi$($S$)

12: $\nabla_\theta J(\theta)$ = [$\nabla_\theta$(log($\pi(A|S)$)) * $\delta$]

13: $\nabla_\varphi J(\varphi)$ = $\nabla_\varphi \delta^2$

14: $\theta$ = $\theta$ + $\alpha$ * $\nabla_\theta J(\theta)$  ▷ $\alpha$: Actor Learning rate 15: $\varphi$ = $\varphi$ + $\beta$ * $\nabla_\varphi J(\varphi)$  ▷ $\beta$: Critic Learning rate

16: $S$ = $S'$

17: done

18: convergence  ▷ Number of training episodes

FIG. 7G

DYNAMIC GOAL-ORIENTED DIALOGUE WITH VIRTUAL AGENTS

TECHNICAL FIELD

The present disclosure generally relates to virtual assistant systems. More specifically, the present disclosure generally relates to systems and methods for providing dynamic chatbot-based conversations that are capable of responding to changes in the goal(s) of an end-user.

BACKGROUND

Natural language understanding systems interpret the word sequences of user utterances, whether spoken, written, or otherwise communicated. For example, natural language understanding systems are used by task-oriented virtual agents. Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks (also referred to herein as "goals" or "intents") include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

The capacity of a virtual assistant to be able to respond to a client query, and the extent to which the response adequately and appropriately resolves a query, often depends on the knowledge base and programmed competences of the virtual assistant. In particular, virtual assistants generally operate by applying programmed rules when responding to user queries. These rules determine the scope of queries that may be addressed by the virtual assistant, and the depth of the response that is provided.

Natural language understanding systems help virtual agents identify what the human user desires. For example, the natural language understanding system may have an intent model that finds the user's intent from the user's utterances. Then, a downstream component of the virtual agent, such as a dialogue manager, can use the intent to identify how to respond to the human user. However, the available systems generally operate such that only pre-defined set tasks can be offered and performed. In other words, virtual agents are generally not able to 'keep-up' with users who may change their goal, sometimes multiple times, during the conversation. Furthermore, in some cases, virtual assistants may attempt to provide a response that simply reiterates a path toward the user's original goal, without regard to the user having moved on to a new goal. Lacking adaptability, the responses provided by an automated system will be limited and fail to address the more natural exchanges that occur when humans converse.

There is a need in the art for a system and method that addresses the shortcomings discussed above.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 7A-7D are a sequence presenting a GD-based Dialogue Policy Learning Algorithm applying DQN techniques;

FIGS. 7E-7G are a sequence presenting a Dialogue Policy Learning Algorithm applying actor critic techniques;

SUMMARY

Figure 1:
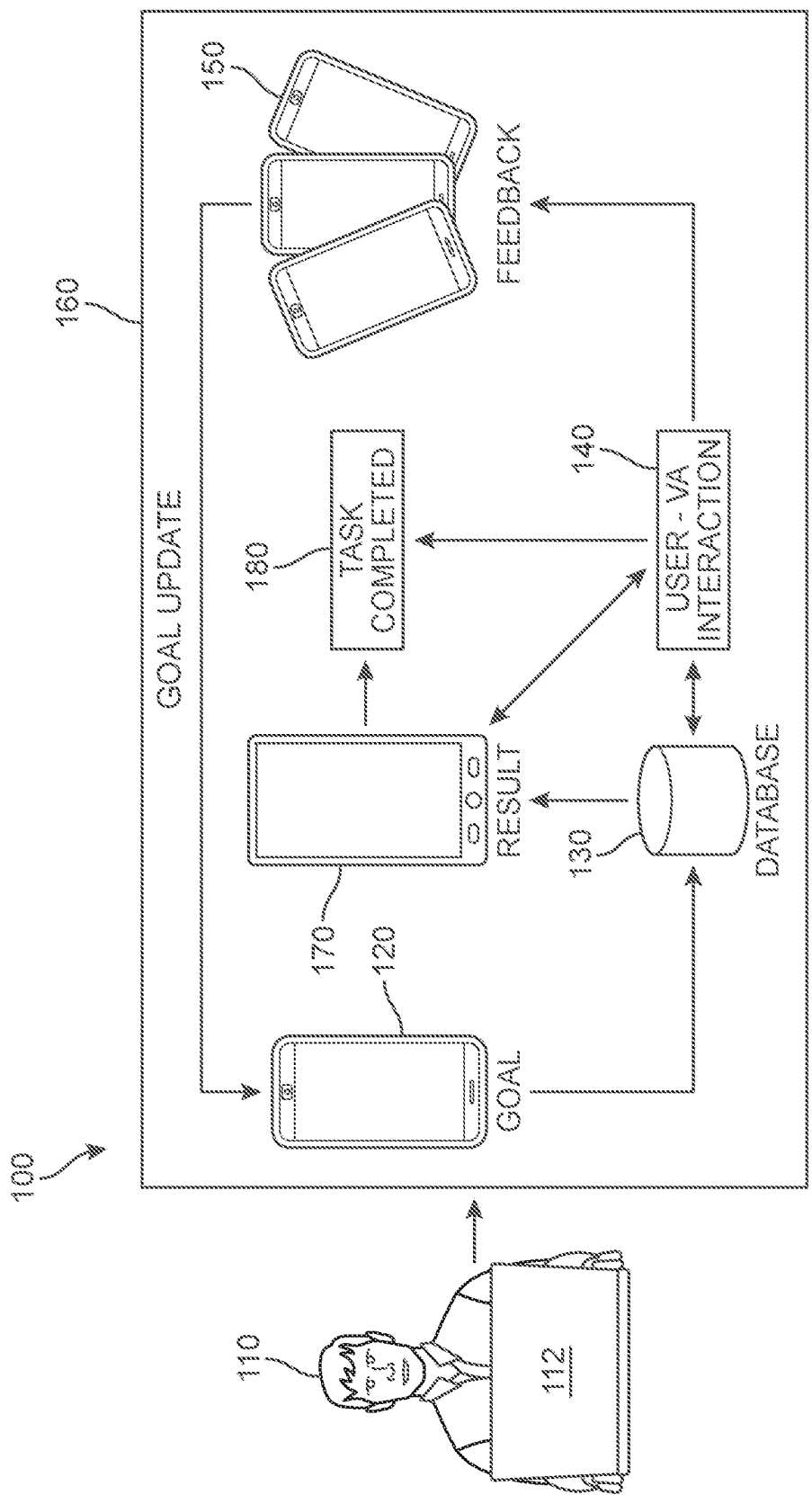
FIG. 1 is a schematic diagram of an overview of an embodiment of a dynamic goal driven (GD) virtual agent.

An end-to-end dynamic goal driven virtual agent (VA) is disclosed. The VA includes a goal-driven module (GDM) with a reinforcement learning-based dialogue manager. The VA is an interactive tool that utilizes both task-specific rewards and sentiment-based rewards to respond to a dynamic goal. The VA is capable of handling dynamic goals with a significantly high success rate and user gratification (human score). As the system is trained primarily with a user simulator, it can be applied to other domains with minimal changes. The dialogue policy learning task is formulated as a Partially Observable Markov Decision Process (POMDP) with a unique state representation and a novel reward model. The VA utilizes the user's sentiment in dialogue policy learning as immediate feedback for identifying goal deviations (discrepancies) and making the VA user-adaptive. Negative sentiments expressed by the user about an aspect of a provided choice is treated as a discrepancy that initiates a new goal. The GDM tracks and updates user goals if any discrepancy occurs.

In one aspect, the disclosure provides computer-implemented method of generating dynamic responses to user utterances during a conversation with a virtual agent. The method includes a first step of receiving, at a dialogue manager, a first input based on a first user utterance, and a second step of identifying, at the dialogue manager, a first goal based on the first input. In addition, the method includes a third step of selecting, at the dialogue manager, a first action based on the first goal, and a fourth step of presenting, via the virtual assistant, a first response based on the first action. The method further includes a fifth step of receiving, at the dialogue manager, a second input based on a second user utterance, and a sixth step of processing the second input via a natural language understanding model configured to generate a sentiment score for the second input and then determining, via a sentiment classifier and using the generated sentiment score, that the second input is associated with a negative user sentiment. In addition, a seventh step includes detecting, at the dialogue manager, a discrepancy with respect to the first goal based on the first input. The method also includes an eighth step of identifying, at the dialogue manager, a second goal that accommodates the detected discrepancy, a ninth step of selecting, at the dialogue manager, a second action based on the second goal, and a tenth step of presenting, via the virtual assistant, a second response based on the second action.

In another aspect, the disclosure provides a non-transitory computer-readable medium storing software comprising instructions executable by one or more computers which, upon such execution, cause the one or more computers to: (1) receive, at a dialogue manager, a first input based on a first user utterance; (2) identify, at the dialogue manager, a first goal based on the first input; (3) select, at the dialogue manager, a first action based on the first goal; (4) present, via a virtual assistant, a first response based on the first action; (5) receive, at the dialogue manager, a second input based on a second user utterance; (6) process the second input via a natural language understanding model configured to generate a sentiment score for the second input; (7) determine, via a sentiment classifier and using the generated sentiment score, that the second input is associated with a negative user sentiment; (8) detect, at the dialogue manager, a discrepancy with respect to the first goal based on the determination of the sentiment classifier; (9) identify, via a goal manager model of the dialogue manager and based on the discrepancy, a second goal that accommodates the detected discrepancy; (10) select, at the dialogue manager, a second action based on the second goal; and (11) present, via the virtual assistant, a second response based on the second action.

In another aspect, the disclosure provides a system for generating dynamic responses to user utterances during a conversation with a virtual agent, the system comprising one or more computers and one or more storage devices storing instructions that are operable, when executed by the one or more computers, to cause the one or more computers to: (1) receive, at a dialogue manager, a first input based on a first user utterance; (2) identify, at the dialogue manager, a first goal based on the first input; (3) select, at the dialogue manager, a first action based on the first goal; (4) present, via a virtual assistant, a first response based on the first action; (5) receive, at the dialogue manager, a second input based on a second user utterance; (6) process the second input via a natural language understanding model configured to generate a sentiment score for the second input; (7) determine, via a sentiment classifier and using the generated sentiment score, that the second input is associated with a negative user sentiment; (8) detect, at the dialogue manager, a discrepancy with respect to the first goal based on the determination of the sentiment classifier; (9) identify, via a goal manager model of the dialogue manager and based on the discrepancy, a second goal that accommodates the detected discrepancy; (10) select, at the dialogue manager, a second action based on the second goal; and (11) present, via the virtual assistant, a second response based on the second action.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

DESCRIPTION OF EMBODIMENTS

Conversation systems such as those providing virtual chatbots are being increasingly relied on by businesses and organizations to increase customer engagement and provide support. Automated chatbot systems can provide users with access to information and/or cause actions to be performed regarding one or more queries. For example, an automated chatbot service may allow users to purchase products or services, apply for a loan, submit travel requests or baggage claims, and a wide range of other goals that can eliminate the necessity of a human agent and expedite resolutions for the customer. Data from multiple sources may be retrieved and used to generate a response to a user in the context of a chatbot service.

However, conventional virtual agents are mainly equipped to provide fixed or pre-programmed responses to customer queries and needs, based on static goals. Traditional chatbots are not designed to negotiate or work with the customer to generate an alternate solution if the originally specified goal is unavailable. Nevertheless, typical real-world interactions often include ambiguity about the customer's end-goal, or involve instances in which customers modify aspects of their stated goal. Thus, human agent-customer interactions often include a conversational flow in which goals or tasks change through the dialogue, where the human agent offers different options and recommendations in response to dynamic tasks.

As will be described in greater detail below, the proposed embodiments describe a dynamic virtual agent (VA) that is configured to learn about the user's need during the conversation in order to identify alternate solutions as needed using deep learning-based reinforcement dialog management techniques. In addition, in some embodiments, the system is configured to handle dynamic goals that require planning and real-time adjustments. In one example, the VA is configured to dynamically anticipate and propose similar and/or alternate goals to the customer by enabling the VA to make autonomous decisions based on parameters and user feedback (e.g., intelligent reasoning). In some cases, the VA may be implemented via Goal-Driven Autonomous (GDA) agent systems that incorporate policy selection and customer sentiment analysis techniques, referred to herein as dynamic goal-driven virtual agents (DVDVAs), or more simply dynamic virtual agents (DVAs).

As a general matter, conversational artificial intelligence can be divided generally into two categories: (a) task-oriented dialogue systems and (b) open-ended dialogue systems. The proposed embodiments are directed toward improving the outcomes associated with task (goal) oriented dialogue systems, which are purposed to offer human users assistance toward accomplishing a particular task. In some cases, the user conveys a goal to the VA through a sequence of utterances, and the VA requests some information from the user that is required in order to complete the task if the user has not already provided this information. The VA 'understands' the goal and serves the goal by performing an action (such as fetching an appropriate result) and then completes the dialogue. In traditional task-oriented dialogue systems, virtual agents complete their task by filling the necessary user task constraints (e.g., intent, slot) and targeting a goal matching the user's original specification(s). However, as noted above, users may not necessarily have a predefined task goal. However, it may be appreciated that in some cases the user may not be satisfied with the initial result presented by the VA and may want to update or change their goal.

Embodiments of the proposed DVA can accommodate ongoing user feedback and work toward their task goal dynamically, make the virtual agent more realistic and effective. For example, in order to accommodate goal deviations, the DVA is configured to intelligently identify goal deviations or discrepancies and update the goal appropriately. In addition, in some embodiments, the DVA can continue serving the user until and unless the user accomplishes their task as desired. In different embodiments, user sentiment is used by the system to determine whether the dialogue is moving forward in a manner consistent with the user's desired trajectory. User sentiment may provide a source of feedback that can be incorporated by the DVA when deciding whether to conclude the dialogue or to continue serving the user based on feedback and other information obtained during the conversation.

In different embodiments, the disclosed system and method may be part of a natural language understanding (NLU) system. As noted above, in some embodiments, the natural language understanding system comprises a sub-system of a virtual agent, also referred to as a virtual chatbot. The virtual agent takes in requests from a customer (or other end-user) and processes the requests before responding back to the customer. To process requests from a customer and respond appropriately, the virtual agent may include multiple subsystems or modules that help solve various sub-tasks. A typical dialogue system can comprise three main components: a) an NLU system that converts natural language messages to structured data containing user intents and specific information called slots; b) a Dialogue Manager (DM) that selects one of the possible agent actions based on this structured information and dialogue history; and c) a Natural Language Generator (NLG) that outputs the selected VA action in a user-understandable language. The fundamental task of a dialogue manager is to optimize dialogue policy, which determines the behavior of the dialogue system based on the given dialogue history. Dialogue optimization can also be viewed as a sequential decision-making problem that can be solved efficiently through reinforcement learning techniques.

While a VA can be trained using supervised learning (i.e., Seq2Seq Models), where an agent learns what to generate as a response given previous user utterances, a key problem with the Seq2Seq approach is the requirement of a massive dialogue corpus to ensure an optimal dialogue policy. In contrast, the data requirement with respect to reinforcement learning is comparatively less, as training can occur via simulated users generated by a user simulator. In one embodiment, the dialogue manager of the proposed DVA is approached as a Partially Observable Markov Decision Problem (POMDP), which can be optimized by Reinforcement Learning (RL) techniques. In general, RL-based dialogue agents learn through rewards received from an environment in response to each action, so designing an appropriate reward model is very crucial and sensitive for any RL based dialogue system. Furthermore, user sentiment can be treated as an explicit and grounded user feedback towards the agent's behavior. Thus, it can be utilized in the dialogue policy learning process to assist end-users in a more appropriate and personalized manner. Such an approach provides greater flexibility to end-users in incorporating user suggestions and feedback in real-time.

In addition, while end-to-end task-oriented VAs may also be used in some systems, they rely on augmentation of slot values, which increase the processing resources required. Furthermore, task-oriented dialogue agents perform poorly when required to adopt a new domain with limited annotation. In contrast, because the underlying knowledge base that may be used by the systems described herein contain comparatively fewer slots, the DVA described herein performs nearly or as well with significantly less complexity and computation. In one embodiment, the DVA incorporates a goal driven agent-module (GDM) paradigm that can make reasonable changes in goal if it observes any discrepancy with a dialogue system so that the agent can adapt to dynamic goals for accomplishing a user task with maximum satisfaction. Such an approach allows the system to effectively provide assistance to users to decide their goal dynamically.

For purposes of introduction, FIG. 1 depicts an overview of an embodiment of a dynamic goal-driven virtual agent system ("DVA system") 100. In different embodiments, a first user 110 may interact with the DVA system 100 by initially describing or proposing their goal, for example via a NLU module of the DVA system 100 that may be accessible via a computing device 112. Simply for purposes of illustration, a scenario in which the first user 110 is seeking to purchase a mobile phone using an embodiment of the DVA service can be represented in FIG. 1. It may be appreciated that a task, such as the purchase of a phone, can involve multiple sub-options aspects (e.g., price, color, size, etc.) as well as predefined aspects (front camera, battery, etc.). While a user may initially identify properties of a phone, these properties may be modified as the user learns more about the available devices, leading to deviation from the original choice.

In FIG. 1, first user 110 may initially have specific device requirements ("target goal") 120, such as a phone with a front-facing 13-megapixel camera and a battery capacity of at least 3000 mAh. The first user 110 may begin a conversation with a virtual sales agent (VSA) and offer some information about his or her original target goal 120 which can optionally be passed through database 130, and then processed by a user-VA interaction chatbot service ("chatbot") 140 for dialogue creation. The VSA performs slot-filling and identifies a result 170, in this case a first device model matching the target goal features, for example with reference to database 130. In some embodiments, the chatbot 140 can generate dialogue 150 in order to request additional user information (query) about the target goal (e.g., to fill slots), offer feedback about the user's choice, and/or attempt to persuade the user to consider a particular option, which may in some instances be associated with a "goal update" 160 that alter the target goal 120.

In some cases, the first user 110 may ask the price of the first device model. When the chatbot 140 responds with a price P1, the first user 110 indicates that P1 is outside his/her budget. In response, the VSA recognizes that the target goal has shifted, and updates the original target goal to represent a new or modified target goal based on the user's provided feedback 150. The VSA again performs slot-filling and produces another result 170, this time corresponding to a second device model that is aligned with the updated target goal features, for example with reference to database 130. The first user 110, pleased with this option, proceeds to purchase the second device model and the (revised) target task is successfully concluded with a final interaction 180.

In some embodiments, a primary objective of the proposed DVA is to learn an optimal dialogue policy $\pi^*$ for a dynamic goal scenario using RL techniques. For example, a dialogue policy $\pi$ selects the most appropriate action for a current dialogue state, i.e., $\pi(s, gs) \rightarrow a$ where s, gs represents the current dialogue state and the current GDM state, respectively. In addition, a policy $\pi$ will be an optimal policy($\pi^*$) if its cumulative episodic reward will always be greater than or equal to the cumulative episodic reward of any other policy. An optimal dialogue policy signifies that the agent behaves most accurately based on the dialogue context.

For purposes of reference, dialogue policy learning can be understood to fall under the episodic RL problem where each episode is represented by Equation (1) below:

$$(s_0, gs_0) \rightarrow [a_0](s_1, gs_1, r_0) \rightarrow [a_1](s_2, gs_2, r_1) \rightarrow [a_2](s_3, gs_3, r_2), \ldots, s_{n-1} \rightarrow [a_{n-1}](s_n, gs_n, r_{n-1})$$

where $s_n$ indicates current dialogue state, $gs_n$ indicates current GDM state, $a_n$ represents the action and $r_n$ represents the reward for taking the action an leading to the transition into the state $s_{n+1}$.

In order to make a policy that is adaptable to goal shifts or deviations, a goal driven module (GDM) tracks goal discrepancies through current user sentiment and dialogue state. The GDM module updates a user's goal if it detects any goal discrepancy with respect to the desired goal. The agent determines the correct and incorrect actions via a reward/penalty technique, which is provided by the environment, for each action. Thus, an objective of the VA is to select actions in a way that maximizes discounted future rewards. To this end, the VA obtains an optimal action at every time-step based on the current dialogue state and the learned policy, which can be expressed by Equation (2):

$$a = \operatorname{argmax}_{a \in A} \pi(s; \theta; \text{sentiment})$$

where A is the set of all agent's actions, and $\theta$ represents all the parameters of the function approximator of the RL model. The model takes current state (s, gs) and user sentiment obtained through NLU processing of current user utterance and dialogue history. The model then selects the most appropriate action from the dialogue policy (n). The selected action is presented to the user after converting it into user understandable form through the NLG module to curate an end-to-end dynamic goal driven system.

For purposes of testing the proposed system, a sample conversation dataset containing 100 dialogues in which the agent serves user goals dynamically to complete the dialogue successfully was created. These samples contain conversations between a buyer (user) and an online seller (VA) of mobile phones. The samples were annotated for their corresponding intent, slot, and sentiment of each utterance. Additional samples were also created similar to the initial dataset and annotated. Thus, the corpus contains conversations that emphasize a goal switch determined based on user sentiment. User sentiment was categorized as positive, negative, and neutral.

Figure 2:
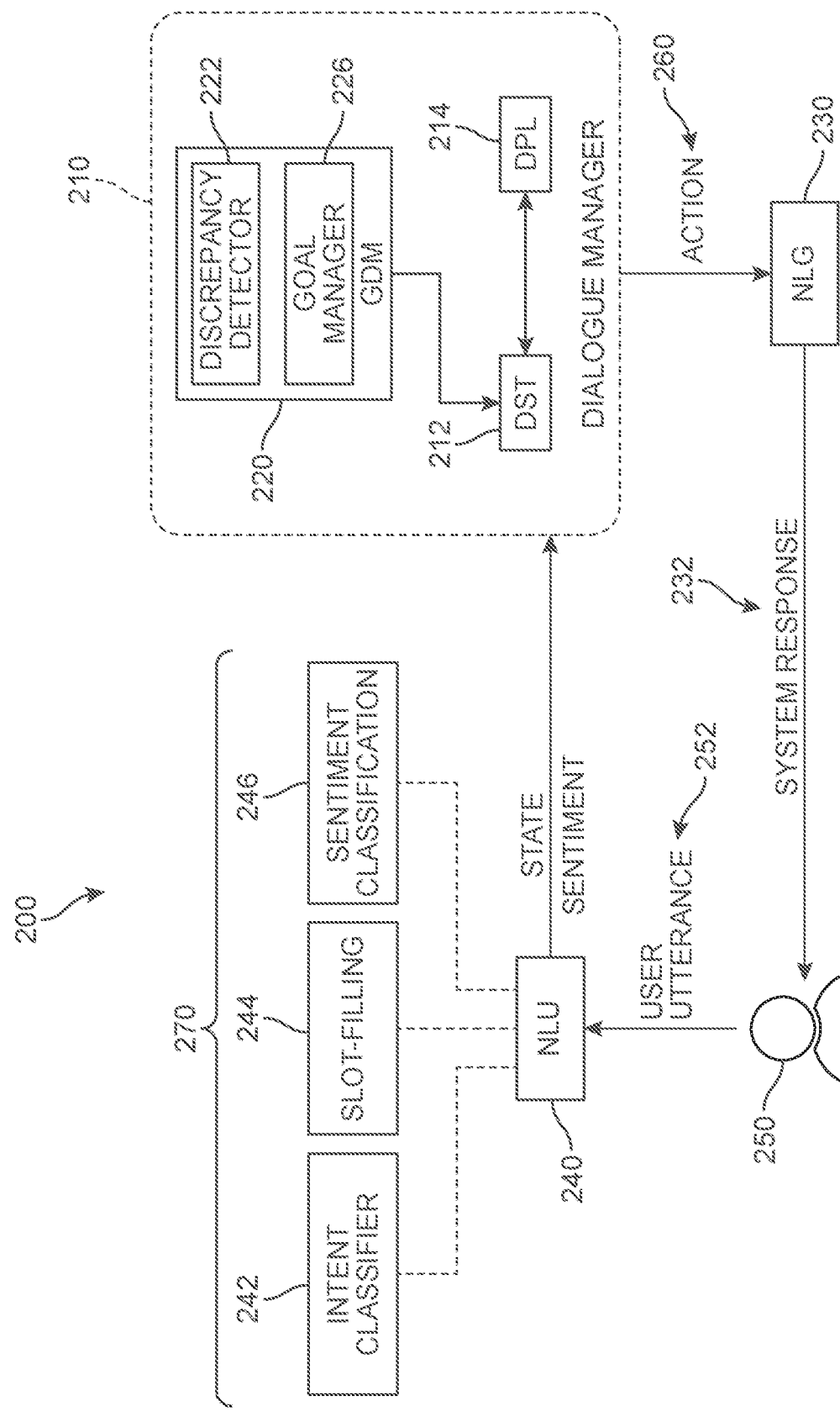
FIG. 2 is a schematic diagram of an architecture of an embodiment of a dynamic GD virtual agent.

FIG. 2 presents a control flow diagram 200 for an embodiment of the proposed dialogue system. In this case, a spoken or text-based language understanding system can comprise a sub-system of a virtual agent. As a non-limiting example, the virtual agent takes in requests from a customer (or other end user) and processes the requests before responding back to the customer. To process requests from a customer and respond appropriately, the virtual agent may include multiple subsystems or modules that help solve various subtasks (e.g., voice recognition). For example, in FIG. 2 a user 250 may be engaged in a conversation with a virtual agent by phone or other voice-based communications, tele-video, and/or through other means including text-based communication (e.g., SMS or a chat-based application) and/or video communication (e.g., using Skype or Facetime).

In different embodiments, a user's utterance 252 may be first processed by an automatic speech recognition module 270 for a natural language understanding (NLU) system 240, which may include a spoken language understanding system. Thus, the NLU system 240 can be understood to serve as an initial module of a dialogue system that converts user utterances to its schematic form. The primary tasks of the incorporated NLU system 240 are Intent Classification (IC), Slot Filling (SF) and Sentiment Classification (SC). The NLU system 240 processes the original user utterance through these sub-modules to provide its schematic which can be processed for the next module of the pipeline (in this case, a dialogue manager 210).

The goal of the speech recognition module 270 is to convert spoken words into a string, or sequence, of words that can be used by systems downstream of the speech recognition module. For example, a speech recognition process may convert a received audio signal (the customer's request over the phone) into the string, or sequence, of words "I would like a hotel in Trento." In general, the goal of the NLU system 240 is to extract the meaning of the string of words passed on from speech recognition module 270. For example, a spoken language understanding system may analyze the phrase "I would like a hotel in Trento" and determine that the customer is looking for information about a hotel. More specifically, in some embodiments, the spoken language understanding system takes in a word sequence as input and outputs (1) the intent of the user via an intent classifier submodule 242, (2) slot names and values via a slot-filling submodule 244, and (3) sentiment associated with the user's utterance via a sentiment classification submodule 246. In some other embodiments, NLU services may also or alternatively include dialogue act classification and non-sentential utterances (NSU). In another example, such services may include coreference resolution, chat language and emoticon recognition, spelling correction, and/or may further include a template-based natural language generation module.

In general, the intent corresponds to the topic of the word sequence (e.g., "flights", "hotels", "restaurants," etc.) and slots correspond to goal-relevant pieces of information. The slot name refers to a type or category of information that may be domain specific, such as "location" or "check-in date" in the context of booking a hotel. The slot values correspond to the particular choice for the slot name, such as "Trento" for the slot name "location." Furthermore, sentiment refers to an analysis of emotion(s) that are likely present in the utterance. In some embodiments, the outputs of NLU system 240, which provide the extracted meaning and emotion of a word sequence, may be passed to dialogue manager 210. In some cases, the passed information could include the category, intent, and list of slot names/values corresponding to the original word sequence.

Figure 3:
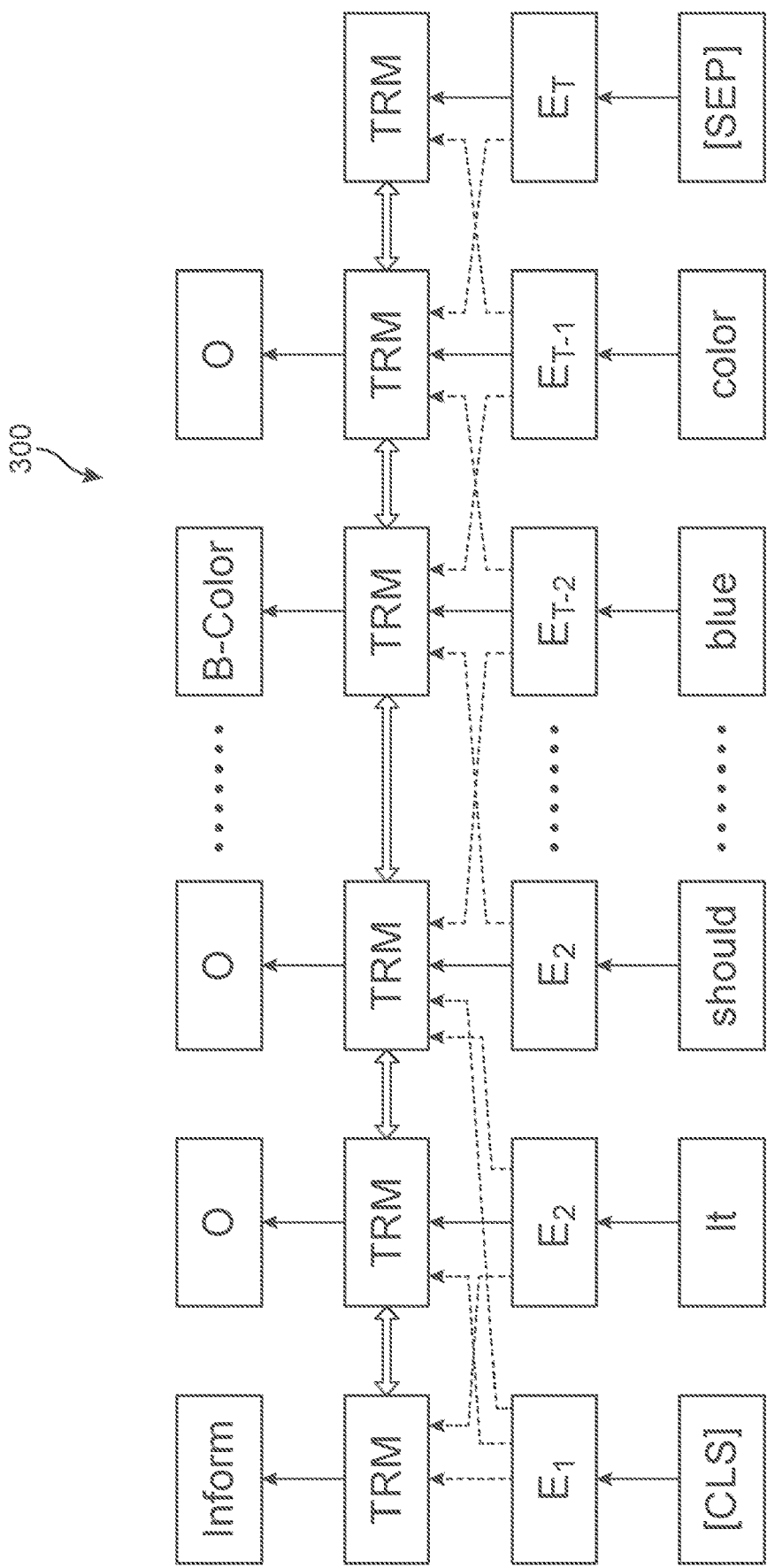
FIG. 3 is an example of input data and control flows in a BERT model for joint intent classification and slot filling, according to an embodiment.

In some embodiments, the NLU system 240 can include a pre-trained joint BERT (Bidirectional Encoder Representations from Transformers) model for intent and slot labeling as well as a Joint Slot Filling and Intent Detection via Capsule Neural networks (Joint SFIDCN) technique and/or bi-directional interrelated model for joint Intent Detection and Slot Filling (SF-ID) techniques. The intent classifier and slot-filling submodules are responsible for intent classification and slot filling of user input ($U_t$). These submodules obtain a user response and predicts or determines its most likely intent and the necessary information slots contained in it. The BERT is a multi-layer bidirectional transformer network that utilizes a concatenated representation of Word-Piece embeddings, positional embeddings, and the segment embedding for learning an efficient language hidden representation. The BERT model takes as input, $x=x_1, x_2, x_3 \ldots \bullet \bullet x_T$, appended with a special classification embedding (CLS) and [SEP] token as the first and last token. The embedded representation is passed to the next layer (Transformer network) that produces a hidden state, $H=h_1, h_2, h_3 \ldots \bullet \bullet H_T$, which is used for intent classification and slot filling as shown in Equation (3):

$$y^i = \text{softmax}(W^i h_1 + b_i)$$

and Equation (4):

$$y_j^s = \text{softmax}(W^s h^j + b^s), j=1,2,3, \ldots N$$

where $y^i$, $W^i$, $h_1$ and $b_i$ are predicted intent, weight matrix, special classification embedding (CLS) and bias matrix at time step j, respectively. In addition, $y_j^s$ indicates slot tag of $x_j^{th}$ input and N is the number of tokens in the input sequence. Referring to FIG. 3, a schematic diagram 300 representing an embodiment of how the input data and the control flows in the model is shown. In order to jointly train the model for intent classification and slot filling, the learning objective which needs to be maximized is defined by Equation (5):

$$p(y^i, y^s | x) = p(y^i | x) \pi_{j=1}^{j=N} p(y_j^s | x)$$

Returning to FIG. 2, in order to identify the sentiment associated with a given utterance ($U_t$), the sentiment classification submodule 246 was trained with the created dataset with reference to Equation (6):

$$s_t = SC(U_t)$$

where the input $U_t$ is user utterance at $t^{th}$ timestamp and $s_t$ is the probability of each of the three sentiment labels (i.e., positive, neutral, and negative). A pre-trained XLNet for sequence classification (xlnet-base-cased) model was implemented with the sample conversation dataset. XLNet is an autoregressive language model that utilizes bi-directional contexts by maximizing the expected likelihood of overall permutations of the input sequence order. The Bi-LSTM model consisted of an embedding layer, a hidden layer with 80 neurons, and a softmax layer. The performance of sentiment classification with XLNet was shown to be superior and was incorporated into the sentiment classifier. However, in other embodiments, other models such as the Pre trained BERT, GRU, LSTM, Bi-LSTM, Bi-LSTM+Attention, and others can alternatively be used to identify sentiment associated with a given utterance.

A core component of the dialogue system is a dialogue manager which is configured to select an appropriate action based on the conversational context. In different embodiments, the goal of dialogue manager 210 is to track the current state of the dialogue between the virtual agent and the customer and to respond to the request in a conversational manner. The dialogue manager 210 can generate an action based on the information received from a spoken language understanding system as well as the state of the dialogue with the customer. These sequences of appropriate actions help the end-user to complete his/her task successfully. A dynamic goal-adapted dialogue manager 210 is depicted in FIG. 2, comprising a Goal Driven Dialogue Module (GDM) 220, a Dialogue State Tracker (DST) 212, and a Dialogue Policy Learner (DPL) 214.

In different embodiments, the GDM 220 is a goal reasoning model that is configured to revise its goal when any discrepancy occurs. The motivation of goal revision is to mitigate the detected discrepancy's effect on the agent's ultimate goal (i.e., task completion). As a general matter, the agent's fundamental concern in a dialogue system is facilitating completion of the user's task with the maximum degree of satisfaction for the user. A discrepancy would then be detected in cases when the user is annoyed or expresses a negative emotion when an agent's actions/served goals are not aligned with the user goal. Thus, the GDM 220 is configured to track discrepancies and update the user's goals accordingly.

As shown in FIG. 2, the GDM 220 comprises two sub-modules: a discrepancy detector 222 and a goal manager 226. As noted earlier, user sentiment and/or feedback can serve as a performance measure, making it suitable for as a parameter for policy learning. The discrepancy detector 222 is configured to detect a discrepancy (i.e., a general dialogue discrepancy or a specific goal discrepancy) based on the user's current sentiment and utterance. The discrepancy information, for example including a description or other representation of current user action, dialogue state, and user sentiment, is then passed to the goal manager 226 for tracking and updating the goal. The goal manager 226 outputs the discrepancy and its corresponding updated goal to the DST 212, which is in communication with the DPL 214 and together determine the appropriate action 260 that should be performed in response to the updated goal. A system response 232 will then be provided to the user 250 via a natural language generator (NLG) module 230.

Additional details regarding the operation of components of the dialogue manager 210 are now provided. In some embodiments, the discrepancy detector 222 is configured to determine a discrepancy based on RL techniques. For example, a reward for each dialogue manager (DM) action can be implemented for learning dialogue policy. A necessary feedback factor (user sentiment) is used for modeling the dialogue policy learning process. In general, a discrepancy event occurs or is detected in cases where a user expresses his/her feedback with a negative sentiment directed towards the agent's action, per Equation (7):

$$D = \begin{cases} 1, & \text{if argmax}(s_t) = 0 \text{ and user\_intent} = 1 \text{(Goal discrepancy)} \\ -1, & \text{if argmax}(s_t) = 0 \text{ and user\_intent} \neq 1 \text{(Goal discrepancy)} \\ 0, & \text{Otherwise (No discrepancy)} \end{cases}$$

where D denotes discrepancy information, (argmax($s_t$)=0) signifies negative user sentiment and (user_intent=1) indicates feedback as user intent.

In addition, the goal manager 226 is configured to formulate a new goal, $G_t$ based on the previous goal, and current user feedback and dialogue state ($S_{t-1}$) in case of goal discrepancy. The goal manager 226 obtains discrepancy information, sentiment score, and/or current user utterance and dialogue state as inputs, and outputs a GDM state/signal that contains discrepancy information, the current goal, and the sentiment score. The goal is updated through a deterministic function that can be represented as in Equation (8):

$$G_t = G_{t-1} \cup (U_t | D_t, ss_t, S_{t-1})$$

and Equation (9):

$$\text{GDMState}_t = [D_t, ss_t, G_t]$$

Where $G_t$, $U_t$, $D_t$, $ss_t$ and $S_{t-1}$ denote user goal, user action, discrepancy, sentiment score and dialogue state at time t, respectively. In the case of a general discrepancy, the goal will be the same ($G_t = G_{t-1}$) and the sentiment score (negative feedback) will help the VA in identifying the consequences of its immediately previous action.

In different embodiments, the DST 212 is configured to determine a dialogue state, which is used to represent the dialogue conversation at a given time. The dialogue state provides a context that helps the dialogue policy module to choose appropriate action on the given context. The DST 212 tracks dialogue state, for example by updating the dialogue state after each user or agent utterance that includes essential information conveyed through the utterance. The DST 212 obtains processed user input from the NLU as input and updates the previous dialogue state with the input to produce the current dialogue state. This is represented by Equation (10):

$$S_t = \text{StateTracker}(S_{t-1}, U_t)$$

and Equation (11):

$$\text{GDMState}_t = [D_t, ss_t, G_t]$$

Where $S_t$, $S_{t-1}$ and $U_t$ represent current state, previous state, NLU processed current user utterance, respectively. In different embodiments, a dialogue state space (not shown here) contains key information such as previous user action, user sentiment, agent request slot, user request slot, dialogue turn, knowledge base status, reward, etc.

Furthermore, in some embodiments, the DPL 214 is of the dialogue manager 210 is configured to estimate a probability distribution over the action space based on Equation (12):

$$a^* = \pi(a|S)$$

where S is the current state and a* is the action estimated with maximum probability through policy π. In a dialogue system, the agent's primary task is to predict the most appropriate action for a given state. The agent receives feedback in terms of reward for the transition (S, a, s') from the environment. As noted earlier, this type of policy learning problem can be viewed as a reinforcement learning (RL) problem where the agent learns through a trial-and-error approach toward policy optimization. In some embodiments, two categories of RL algorithms can be applied toward this task, including value-based algorithms and policy-based algorithms, where value-based methods implicitly optimize a policy through optimizing a Q Value function, and policy-based algorithms optimize a policy directly through maximizing objective (i.e., a cumulative episodic reward).

As one example, the dynamic goal driven policy was optimized using a Deep Q Network (DQN), the Actor-Critic (AC) Method, and/or their variants. However, it should be understood that the dynamic goal driven policy for proposed systems may be optimized using other reward methods, such as but not limited to (a) reducing the variance of the policy gradient (e.g., the REINFORCE algorithm) such as Vanilla Policy Gradient (VPG); (b) Natural Policy Gradient (Optimization) (NPG/NPO/TNPG); (c) Trust Region Policy Optimization (TRPO); (d) Proximal Policy Optimization (PPO); (e) Deep Deterministic Policy Gradient (DDPG); (f) Twin Delayed DDPG (TD3); (g) Advantage Actor-Critic (A2C); (h) Asynchronous Advantage Actor-Critic (A3C); (i) Soft Actor-Critic (SAC); (j) Hindsight Experience Replay (HER); (k) Generalized Advantage Estimate Learning (GAEL), and other reinforcement learning algorithm techniques for optimization.

Figure 4:
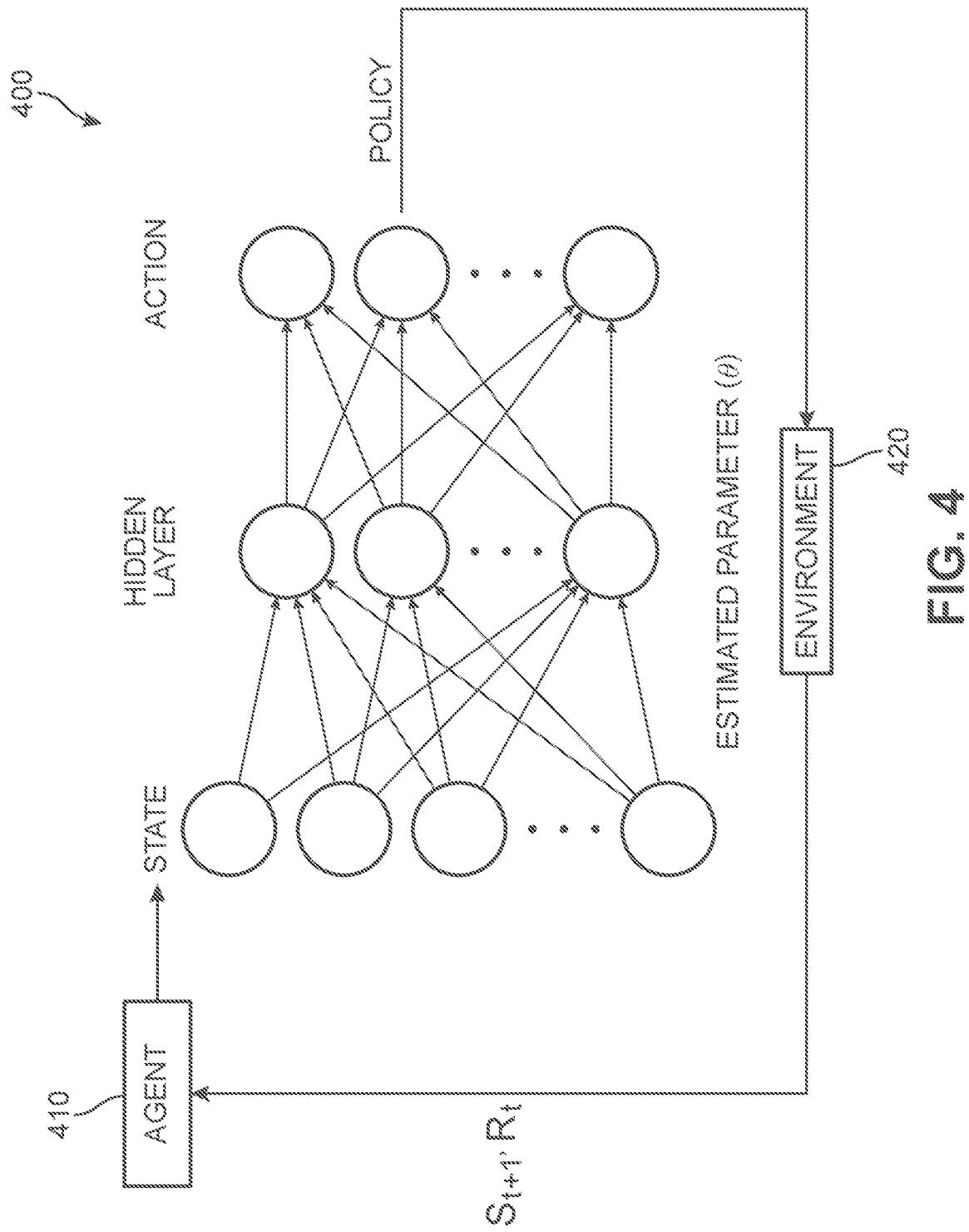
FIG. 4 is a schematic diagram of a dialogue policy optimization process using a Deep Q Network (DQN), according to an embodiment.

Referring to a schematic diagram of an embodiment of dialogue optimization 400 through DQN in FIG. 4, in some embodiments, the DVA is modeled as a DQN RL agent 410 with inputs comprising of the dialogue state and GDM signal. The agent 410 receives the current dialogue state and GDM signal input in structural form from the agenda-based user simulator. The output of the network is a probability distribution over the action space. For each action, the agent 410 receives feedback as a reward from environment 420 consisting of a user simulator and state tracker. The current dialogue state and GDM signal are used by the DQN agent to predict the next action by computing Q(S,$a_i$) where i ranges over all possible actions and then selects the action which has the highest Q value. Thus, the problem is reduced to an approximating Q value function which can be optimized using the following Bellman equation, represented by Equation (13):

$$Q(S,a) = E[r + \gamma \max Q(S',a')]$$

where S is the current state, a is the action taken on state S which results in a new state S' with a reward of r, y is discount factor in the range of [0, 1], and a' is the action on S' that provides maximum reward. In addition, dialogue policy optimization problem leads to a Q function approximation that learns from temporal difference error. The error (temporal difference) is defined as per Equation (14):

$$L = [(r + r + \gamma \max / Q^\sim(S^\sim, a^\sim) - Q(S,a)]^2$$

where Q is the prediction network and Q' is the target network.

Figure 5:
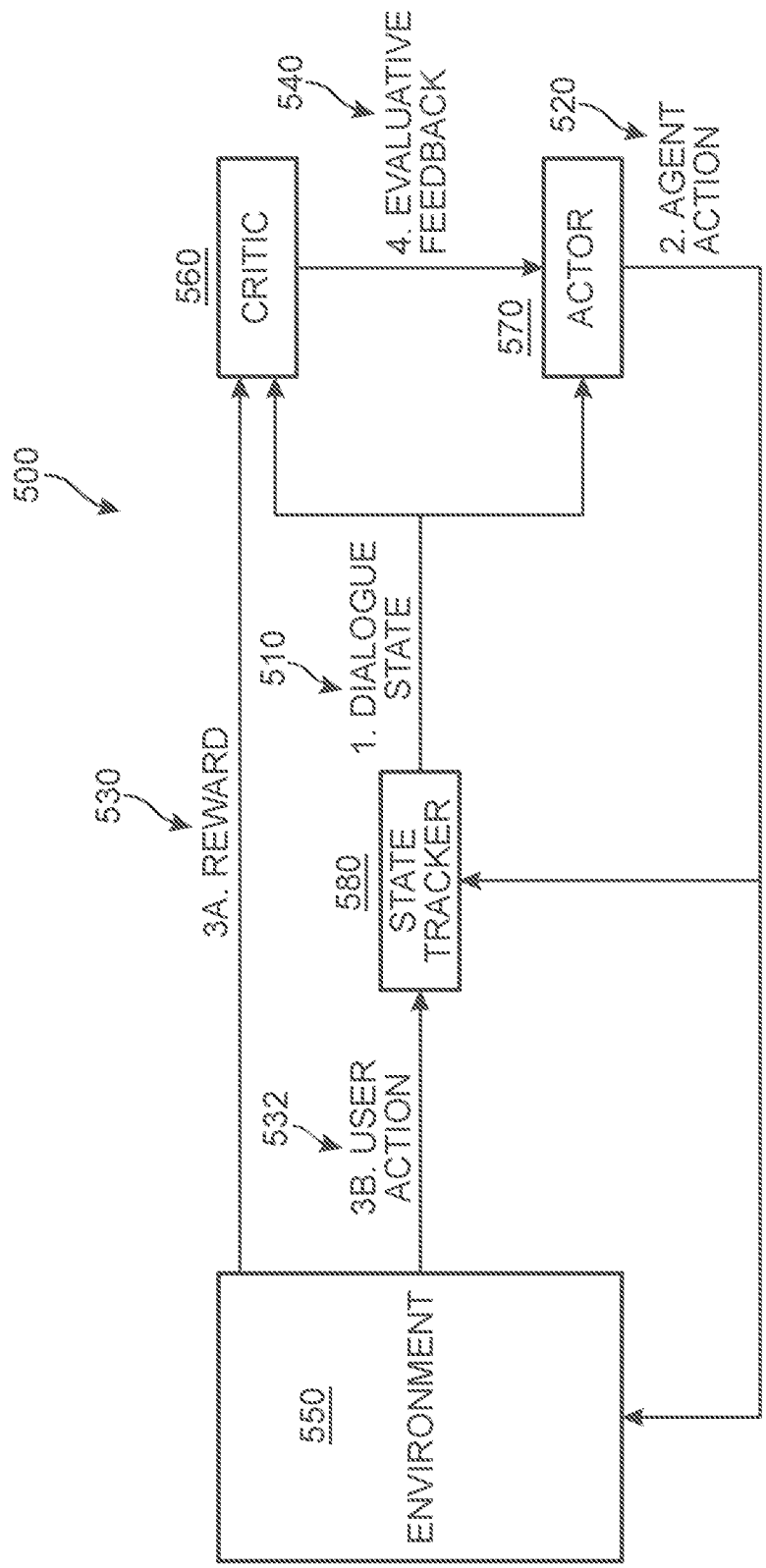
FIG. 5 is a schematic diagram presenting an actor critic training architecture, according to an embodiment.

In addition, the Actor-Critic (AC) method—an amalgamation of a value-based RL algorithm and a policy-based RL algorithm—was also used to optimize the dynamic goal driven policy. The AC method consists of two networks: 1) an actor network that optimizes policy and predicts agent action based on the current state, and 2) a critic network evaluates the predicted action and provides feedback to the actor network. For purposes of clarity, an embodiment of an actor critic training architecture 500 is presented in FIG. 5. The architecture 500 includes a sequence of steps that may loop or cycle back as additional or different information is obtained. For example, in a first step, a state tracker module 580 determines a dialogue state 510, which is shared with both a critic module 560 and an actor module 570. The actor module 570 determines an agent action 520 in a second step, which is sent back to environment 550 and the state tracker module 580. The environment 550 receives a reward 530 and/or a user action 532 in a third step. In cases of reward 530, the information is submitted to the critic module 560, which produces evaluative feedback 540 in a fourth step for use by the actor module 570. In case of user action 532, the state tracker module 580 can determine a new dialogue state 510 for feeding into both the critic module 560 and the actor module 570.

Applying a Policy Gradient method, the gradient of the objective function (J) is calculated with respect to the policy network parameter (θ) per Equation (15):

$$\nabla_\theta J(\theta) = E[\nabla_\theta (\log(\pi(s,a)) * Q_\pi(s,a)]$$

where s, π, and a represent state, current policy and action taken by the agent in the state (s), respectively, and $Q_\pi(s, a)$ is the state-action value. The term $\nabla_\theta(\log \pi)$ indicates the direction of θ in parameter space whereas the next term signifies whether the taken action a is good (if positive) or bad (if negative). The gradient ascent of the objective function encourages the agent to continue to perform 'good' actions and decrease 'bad' actions. In addition, the critic network evaluates the goodness/badness of the action and provides corresponding feedback to the policy network (agent). The new gradient is defined in Equations (16) and (17):

$$\delta = [(r+\gamma*V(s'))-V(s)]$$

$$\nabla_\theta J(\theta) = E[\nabla_\theta(\log(\pi(s,a))*\delta]$$

Where δ is the TD-error, r is the reward for taking action a in the current state s, which leads to a new state s'. Furthermore, V(.) signifies the state value calculated through the critic network.

Figure 6:
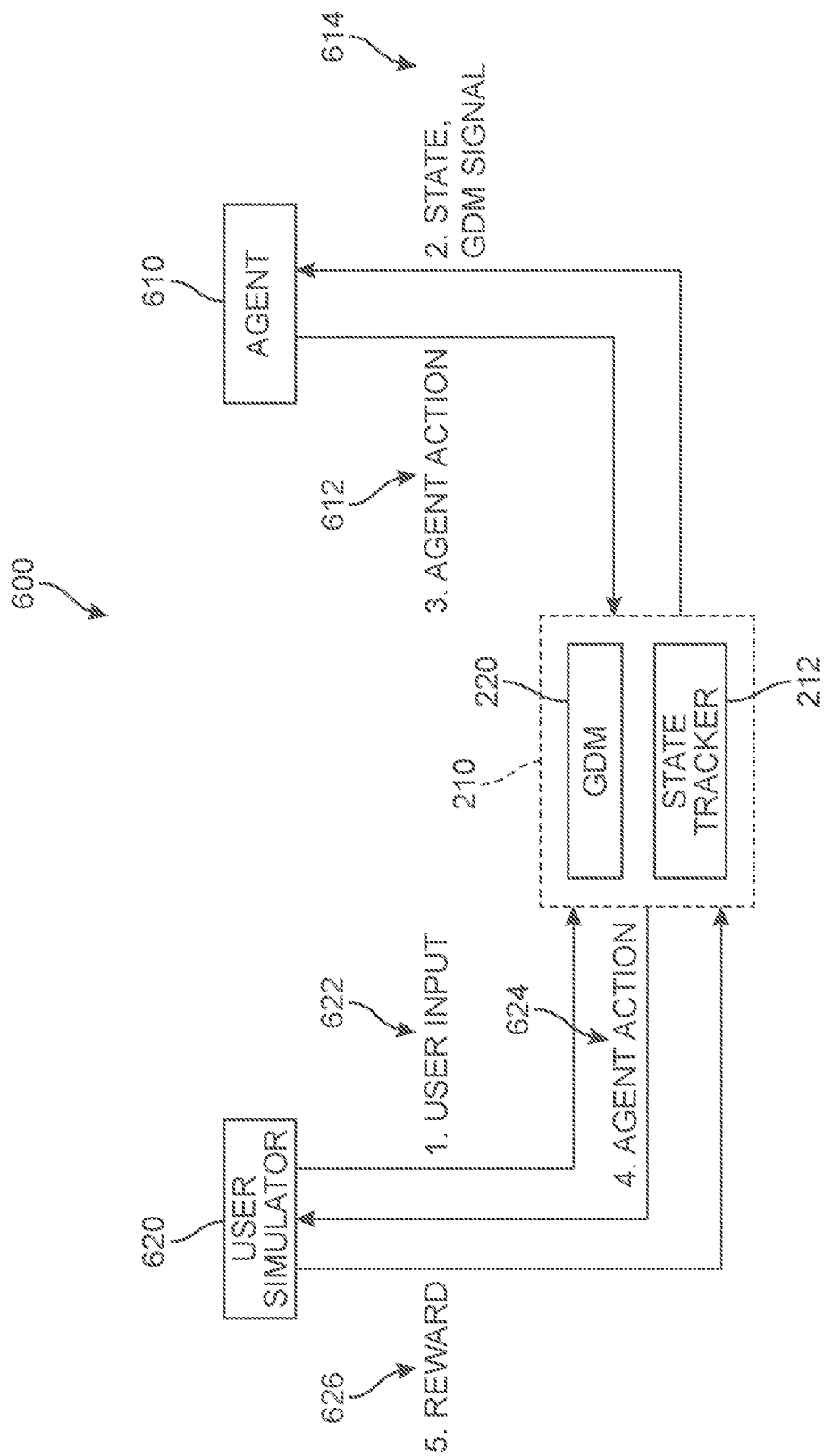
FIG. 6 is a schematic flow diagram presenting a training flow of a reinforcement learning-based agent framework, according to an embodiment.

A training loop 600 for an embodiment of the proposed dialogue system is shown in FIG. 6. The pseudo-environment in the simulation obtains or identifies user actions based on the current user state and immediate agent action. As shown in FIG. 6, training flow can begin with a user input 622 being provided by the user simulator 620 for processing and analysis to goal driven module (GDM) 220 and DST module 212, collectively referred to as dialogue manager 210. Updated state and GDM signal data 614 are obtained from the state space based on the user input 622 and conveyed to agent 610. In response, an agent action (a) 612 is selected, as per the policy π, and submitted to the user simulator 620 via the dialogue manager 210. Depending on the goal, the user simulator 620 can generate feedback (e.g., a reward) 626 that is received by the dialogue manager 210. For example, the agent 610 learns about the action consequences (Q(S, a)) with the provided feedback in terms of reward/penalty for the action (a) from user simulator 620.

As a general matter, the state space refers to a concatenated representation of the dialogue and GDM states. In one embodiment, the state space is an array of 2n+7s+N+11 variables, where n is the number of intents, s is the number of slots and N is the maximum dialogue length limit (e.g., in this case 20). The state contains context capturing variables such as current user action, previous agent action, agent inform slots, user informs slots, user request slots, which are represented as one hot embedding of intents (n: current user intent, n: previous agent intent), and slots. The dialogue turn's one hot representation is also embedded in the state so that the agent can learn to complete dialogue in fewer turns as it is provided in the form of a task success reward in terms of dialogue turns.

In some embodiments, the proposed state can comprise an extension of a Go-Bot Dialogue state. For example, the state can include new information such as sentiment score (ss), meta-data (user repetition, agent repetition) and GDM state. To capture the intensity of user sentiment, the obtained sentiment probability (st) is scaled as a sentiment score in the range of [0, 1] as in Equation (18):

$$ss = \begin{cases} 1 - p_s, & \text{if } \operatorname{argmax}(s_t) = 0(\text{tag} = \text{negative}) \\ 0.5 * p_s, & \text{if } \operatorname{argmax}(s_t) = 1(\text{tag} = \text{neutral}) \\ p_s, & \text{Otherwise (tag = positive)} \end{cases}$$

In addition, the action space of the virtual agent refers to a group of primitive actions that may be selected by the virtual agent. In one example the action space includes seven categories having a total of 31 primitive actions. The categories in this example are specification (e.g., Sp for asking for specifications), request (e.g., BrandReq), inform (e.g., CostInform), confirm (e.g., Color(Red)), result, done, and salutation. The actions are formulated after analyzing the problem (e.g., a mobile device seller environment and its feasible corner cases). Each agent action then constitutes intent/categories and its corresponding slots.

In some embodiments, rewards may be implemented via a task-oriented reward function (TR), as shown in Equation (19):

$$TR = \begin{cases} +7*(\text{Max}LenLimit - n), & \text{if success} \\ -2*\text{Max}LenLimit, & \text{if failure} \\ |LSlt' - LSlt| & \text{if } (|LSlt' - LSlt|) \\ -1 & \text{otherwise} \end{cases}$$

which primarily focuses on retrieving slot values. In order to motivate the agent toward accomplishing user's desired task in a minimum number of steps, the agent is penalized by a reward value of −1 for each action that leads to a non-terminal state. In Equation (19), TR: Task Oriented Reward, n: No. of turns taken to complete, LSlt': Length of Informed Slot in current state S' and LSlt: Length of Slot list in previous state S.

With only task-oriented reward functions, agent actions were associated with some repetitions. In order to avoid inappropriate (repetitive) actions from the agent's side, user sentiment information was incorporated that served as explicit feedback to the agent during the learning process. This sentiment-based reward (SR) is shown in Equation (20) below:

$$SR = \begin{cases} 3*(s-1), & \text{if } s < 0.5(\text{Negative User Sentiment}) \\ s, & \text{if } s = 0.5(\text{Neutral User Sentiment}) \\ 8*(s-0.5), & \text{otherwise (Positive User Sentiment)} \end{cases}$$

where s=Sentiment Score and SR=Sentiment based Reward. This approach enables the dialogue manager to understand whether it has selected an appropriate response related to the state of the dialogue. Thus, the final reward at each time-step is Reward=TR+SR. During testing, the proposed agent with this combined reward function did not exhibit any repetitive loop, as it was highly penalized for such actions during training. In addition, if the user is repeating something, it implies that the agent has not selected the appropriate action with respect to the initial intent, which would trigger negative user sentiment for which the agent would be penalized.

Similarly, the scenario where the agent generates an unrelated question in response to a user query also attracts a negative reward. The scalar numbers present in the reward functions are chosen empirically. The reward model utilizes the transformed sentiment score (ss) to reward/penalize the agent within the appropriate direction with higher confidence.

Returning to FIG. 2, once an action has been identified, the output of dialogue manager 210 is provided to the NLG module 230. In different embodiments, the NLG module 230 randomly selects one of the templates from a predefined set of templates for each action before presenting the response to users. Once the VA selects an action, there follows a knowledge base stage that fills required details (slot value/ result). This final action is converted into a natural language form through this template-based NLG module 230. For purposes of reference, an embodiment of the proposed GDM incorporated Dialogue Policy Learning Algorithm with DQN(A) and ACM(B) is provided with reference to FIGS. 7A-7C.

Figure 8:
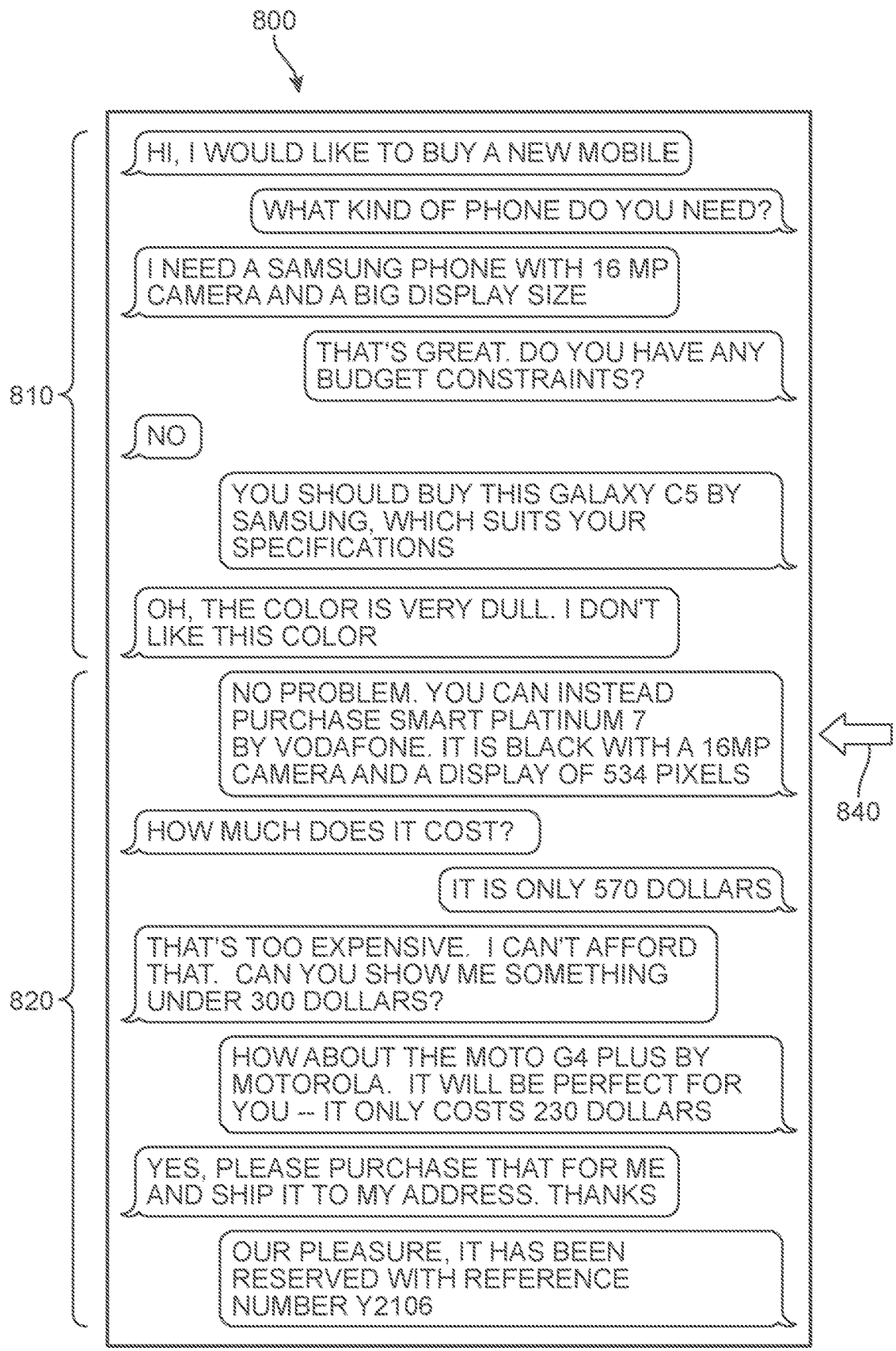
FIG. 8 is an example of a conversation between a virtual agent and end-user that may occur using the proposed system, according to an embodiment.

In order to better illustrate the benefits of the proposed systems, FIG. 8 presents a sample dialogue 800 generated using the proposed systems. In a first segment 810, the dialogue 800 includes an exchange between a user and agent in which the user is seeking a new mobile device. The agent offers a first product ("Galaxy C5") based on the user's stated specifications, but the user is not interested in this selection. Most of the existing VAs would terminate the conversation once they serve the proposed (initial) goal. However, as shown in FIG. 8, the user continues to interact with the VA and again finds an unsuitable feature (discrepancy). He/she provides feedback on the conflicting goal (Cost) component, and the VA re-serves the user through accommodating his/her suggestion into the previous goal. In other words, in this type of real-life scenario, it is very common for a customer not to have a rigid and predefined goal for a task. Users may diverge from their proposed goal for example when maximizing their utility value. In this case, the proposed agent can continue seamlessly into second segment 820 where a second and then a third product are offered, until the user is satisfied with the selection. In contrast, a traditional VA may not be able to accommodate users' feedback, lead to dialogues ending without complete user satisfaction.

As discussed above, sentiment plays a significant role in identifying goal deviations or discrepancies, offering feedback regarding the agent's served goal. In FIG. 8, the user expresses negative sentiment towards the price aspect of the proposed phone when he/she learns its cost. The discrepancy detector recognizes the negative sentiment as a discrepancy point and triggers the goal manager depending on user action. The goal manager updates the previous goal by incorporating the user's feedback (cost <300). The GDA Signal (discrepancy and updated goal) along with the current dialogue state are passed to the dialogue policy learner. Next, the VA shows a phone matching with the updated goal. The user's goal is thus achieved.

Figure 9:
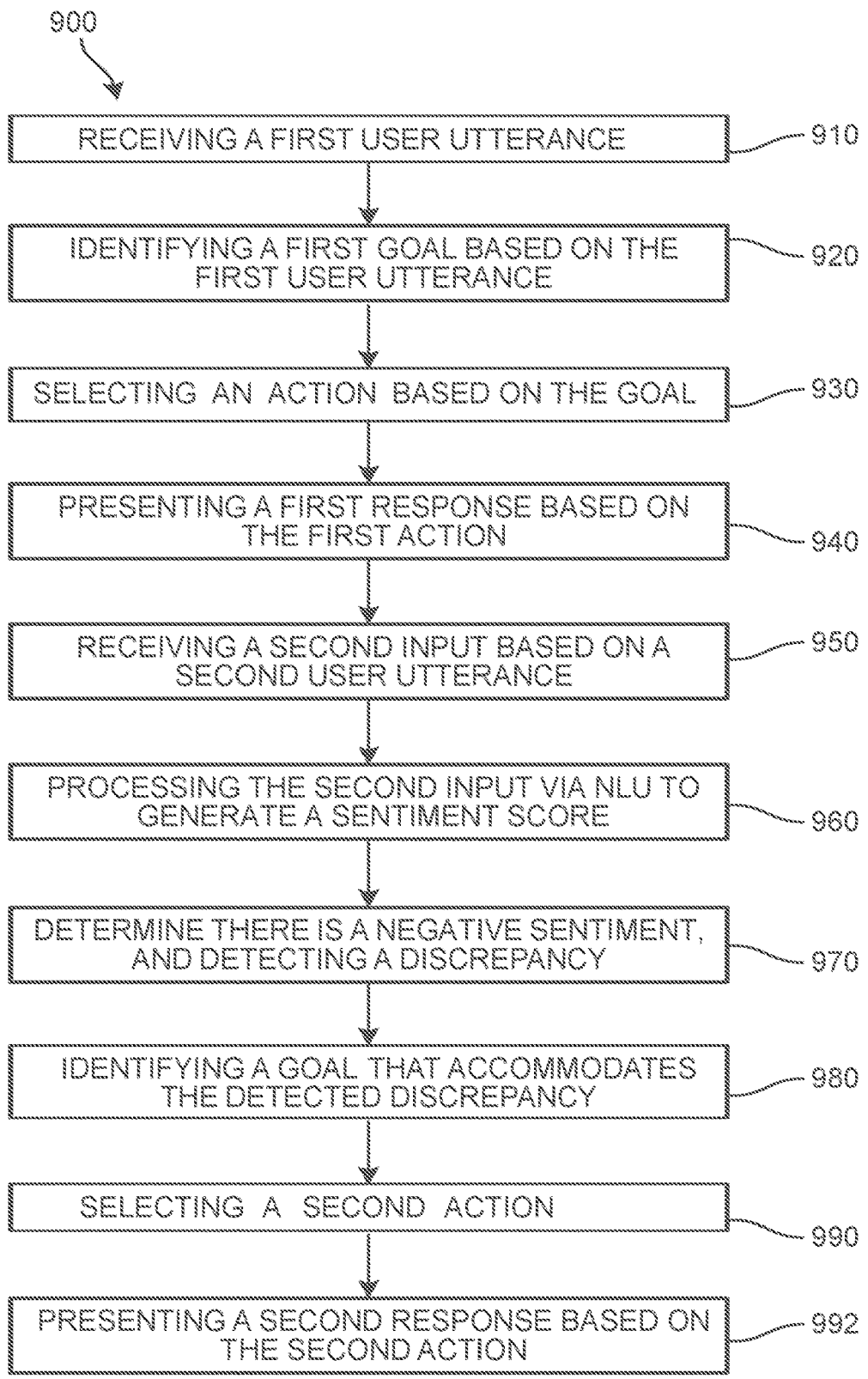
FIG. 9 is a flow chart depicting a method of generating dynamic responses to user utterances during a conversation with a virtual agent.

FIG. 9 is a flow chart illustrating an embodiment of a method 900 of generating dynamic responses to user utterances during a conversation with a virtual agent. The method includes a first step 910 of receiving, at a dialogue manager, a first input based on a first user utterance, and a second step 920 of identifying, at the dialogue manager, a first goal based on the first input. In addition, the method includes a third step 930 of selecting, at the dialogue manager, a first action based on the first goal, and a fourth step 940 of presenting, via the virtual assistant, a first response based on the first action. The method further includes a fifth step 950 of receiving, at the dialogue manager, a second input based on a second user utterance, and a sixth step 960 of processing the second input via a natural language understanding model configured to generate a sentiment score for the second input, and then determining, via a sentiment classifier and using the generated sentiment score, that the second input is associated with a negative user sentiment. In addition, a seventh step 970 includes detecting, at the dialogue manager, a discrepancy with respect to the first goal based on the first input. The method also includes an eighth step 980 of identifying, at the dialogue manager, a second goal that accommodates the detected discrepancy, a ninth step 990 of selecting, at the dialogue manager, a second action based on the second goal, and a tenth step 992 of presenting, via the virtual assistant, a second response based on the second action.

In other embodiments, the method may include additional steps or aspects. For example, the method can further include a step of identifying a first sentiment associated with the second user utterance and wherein the discrepancy is detected based on the first sentiment. In such cases, the method can also include a step of formulating the second goal based on both the first goal and the generated sentiment score. In some embodiments, the second utterance includes feedback regarding the first response, and formulating the second goal is additionally based on the feedback. In another example, the method also includes causing, in response to the detected discrepancy, a negative reward to be provided to the goal manager model, thereby penalizing the virtual agent in order to improve the ability of the goal manager model to determine appropriate goals.

In some embodiments, the method also includes steps of receiving, at the dialogue manager, a third input based on a third user utterance, determining, via the sentiment classifier, that the third input is associated with a positive user sentiment, and providing a positive reward to the dialogue manager, thereby reinforcing the goal manager model and the link between the selected goal and user inputs.

In another example, the method further includes steps of tracking dialogue state for the conversation, including one or more of previous user action(s), previous user sentiment(s), previous user request(s), previous dialogue turns, previous rewards, and knowledge base status, and formulating the second goal based on the current dialogue state. In one embodiment, the first action and the second action are each selected with reference to a dialogue policy that is trained and optimized via reinforcement learning techniques configured to maximize the cumulative episodic reward. In such cases, the method can also include a step of causing a penalty to be applied to the virtual agent for each action that leads to a non-terminal conversation state.

As described herein, a dynamic goal-oriented virtual agent has been developed which is capable of handling variations in user goals in real-time. The system provides an end-to-end dynamic goal driven virtual agent by incorporating a GDM module with a reinforcement learning-based dialogue manager. Furthermore, the VA is interactive, utilizing task-specific rewards and sentiment-based rewards in order to progress toward a dynamic goal. A dataset was created which contains dialogues between users and the agent, where samples of this dataset are annotated with intent, slot and sentiment and used to test the embodiments described herein. The proposed system can be useful for any task-oriented dialogue system where the end-users determine their goal dynamically. The system enhances the capability of a typical VA to readily accommodate more realistic scenarios. Furthermore, as the system is trained primarily with a user simulator, it can be applied to other domains with minimal changes. In the course of a conversation, the user sentiment provides grounded feedback about agent behavior, including goal serving actions. User sentiment has been shown to be an appropriate indicator for goal discrepancy that guides the agent to complete the user's desired task successfully. The negative sentiment expressed by the user about an aspect of the provided choice is treated as a discrepancy that is being resolved by the GDM depending upon the observed discrepancy and current dialogue state. Through experimental results (qualitative and quantitative), it has been shown that the proposed sentiment-aware VA adapts users' dynamic behavior for its goal setting with substantial efficacy in terms of primary objective (i.e., a task success rate of at least (0.88)).

It should be understood that the systems and/or methods as described herein may be implemented using different computing systems, components, modules, and connections. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices.

Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A computer-implemented method of controlling a reinforcement learning-based dialogue agent by generating dynamic responses to user utterances during a conversation with the agent, the method comprising:
   receiving, at a dialogue manager software system, a first input based on a first user utterance;
   identifying, at a goal manager subsystem of the dialogue manager software system, a first goal based on the first input and a dialogue policy that is updated using reinforcement learning;
   selecting, at the dialogue manager software system, a first action based on the first goal;
   converting the first action into a user understandable first response through a natural language generator module;
   presenting, by the reinforcement learning-based dialogue agent on a display, the first response;
   receiving, at the dialogue manager software system, a second input based on a second user utterance;
   applying a natural language understanding (NLU) sentiment classification model to determine a user sentiment of the second user utterance;
   responsive to determining a negative sentiment, detecting, at a discrepancy detector subsystem of the dialogue manager software system, a goal discrepancy in which the second user utterance includes user feedback having the negative sentiment directed towards the first action;
   responsive to detecting the goal discrepancy, generating a penalty based on the goal discrepancy;
   responsive to generating the penalty, updating the dialogue policy to apply the penalty to the first action;
   tracking, by dialogue state tracker, a dialogue state for the conversation;
   responsive to detecting the goal discrepancy and updating the dialogue policy, passing a signal with a description or other representation of a current user action, a current dialogue state, and the determined user sentiment to a goal manager;
   responsive to receiving the signal, the goal manager determining a second goal from the updated dialogue policy based on the current user action, the current dialogue state, and the user sentiment;
   selecting, at the goal manager subsystem of the dialogue manager software system, a second action based on the second goal; and
   performing, by the reinforcement learning-based dialogue agent, the second action.

2. The method of claim 1, wherein the first action includes determining and presenting, via a display, a first recommendation for a first product, the first user utterance indicates disappointment with the first recommendation, and the second action includes determining and presenting, via the display, a second recommendation for a second product.

3. The method of claim 1, further comprising training the reinforcement learning-based dialogue agent with an agenda-based user simulator by generating messages by the agenda-based user simulator and passing the messages to the reinforcement learning-based dialogue agent.

4. The method of claim 3, wherein at least one message generated by the agenda-based user simulator includes an agenda-based user simulator goal and at least one message generated by the agenda-based user simulator includes feedback related to a reinforcement learning-based dialogue agent action.

5. The method of claim 1, wherein tracking the dialogue state for the conversation includes tracking one or more of previous user action(s), previous user sentiment(s), previous user request(s), previous dialogue turns, previous rewards or penalties, and knowledge base status.

6. The method of claim 3, wherein training the reinforcement learning-based dialogue agent includes training the agent to perform actions based on optimizing the dialogue policy is to maximize a cumulative episodic reward.

7. The method of claim 6, further comprising updating the dialogue policy to apply a penalty to the reinforcement learning-based dialogue agent for each action that leads to a non-terminal conversation state.

8. A non-transitory computer-readable medium storing software comprising instructions executable by one or more computers which, upon such execution, cause the one or more computers to control a reinforcement learning-based dialogue agent by generating dynamic responses to user utterances during a conversation with the agent by performing the following:
  receive, at a dialogue manager software system, a first input based on a first user utterance;
  identify, at a goal manager subsystem of the dialogue manager software system, a first goal based on the first input and a dialogue policy that is updated using reinforcement learning;
  select, at the dialogue manager software system, a first action based on the first goal;
  convert the first action into a user understandable first response through a natural language generator module;
  present, by the reinforcement learning-based dialogue agent on a display, the first response;
  receive, at the dialogue manager software system, a second input based on a second user utterance;
  apply a natural language understanding (NLU) sentiment classification model to determine a user sentiment of the second user utterance;
  responsive to determining a negative sentiment, detect, at a discrepancy detector subsystem of the dialogue manager software system, a goal discrepancy in which the second user utterance includes user feedback having the negative sentiment directed towards the first action;
  responsive to detecting the goal discrepancy, generate a penalty based on the goal discrepancy;
  responsive to generating the penalty, update the dialogue policy to apply the penalty to the first action;
  track, by dialogue state tracker, a dialogue state for the conversation;
  responsive to detecting the goal discrepancy and updating the dialogue policy, pass a signal with a description or other representation of a current user action, a current dialogue state, and the determined user sentiment to a goal manager;
  responsive to receiving the signal, determine, by the goal manager, a second goal from the updated dialogue policy based on the current user action, the current dialogue state, and the user sentiment;
  select, at the goal manager subsystem of the dialogue manager software system, a second action based on the second goal; and
  perform, by the reinforcement learning-based dialogue agent, the second action.

9. The non-transitory computer-readable medium storing software of claim 8, wherein the first action includes determining and presenting, via a display, a first recommendation for a first product, the first user utterance indicates disappointment with the first recommendation, and the second action includes determining and presenting, via the display, a second recommendation for a second product.

10. The non-transitory computer-readable medium storing software of claim 8, wherein the instructions further cause the one or more computers to train the reinforcement learning-based dialogue agent with an agenda-based user simulator by generating messages by the agenda-based user simulator and passing the messages to the reinforcement learning-based dialogue agent.

11. The non-transitory computer-readable medium storing software of claim 10, wherein at least one message generated by the agenda-based user simulator includes an agenda-based user simulator goal and at least one message generated by the agenda-based user simulator includes feedback related to a reinforcement learning-based dialogue agent action.

12. The non-transitory computer-readable medium storing software of claim 8, wherein tracking the dialogue state for the conversation includes one or more of previous user action(s), previous user sentiment(s), previous user request(s), previous dialogue turns, previous rewards or penalties, and knowledge base status.

13. The non-transitory computer-readable medium storing software of claim 8, wherein training the reinforcement learning-based dialogue agent includes training the agent to perform actions based on optimizing the dialogue policy is to maximize a cumulative episodic reward.

14. The non-transitory computer-readable medium storing software of claim 13, wherein the instructions further cause the one or more computers to update the dialogue policy to apply a penalty to the reinforcement learning-based dialogue agent for each action that leads to a non-terminal conversation state.

15. A system for controlling a reinforcement learning-based dialogue agent by generating dynamic responses to user utterances during a conversation with the agent, the system comprising one or more computers and one or more storage devices storing instructions that are operable, when executed by the one or more computers, to cause the one or more computers to:
  receive, at a dialogue manager software system, a first input based on a first user utterance;
  identify, at a goal manager subsystem of the dialogue manager software system, a first goal based on the first input and a dialogue policy that is updated using reinforcement learning;
  select, at the dialogue manager software system, a first action based on the first goal;
  convert the first action into a user understandable first response through a natural language generator module;

present, by the reinforcement learning-based dialogue agent on a display, the first response;

receive, at the dialogue manager software system, a second input based on a second user utterance;

apply a natural language understanding (NLU) sentiment classification model to determine a user sentiment of the second user utterance;

responsive to determining a negative sentiment, detect, at a discrepancy detector subsystem of the dialogue manager software system, a goal discrepancy in which the second user utterance includes user feedback having the negative sentiment directed towards the first action;

responsive to detecting the goal discrepancy, generate a penalty based on the goal discrepancy;

responsive to generating the penalty, update the dialogue policy to apply the penalty to the first action;

track, by dialogue state tracker, a dialogue state for the conversation;

responsive to detecting the goal discrepancy and updating the dialogue policy, pass a signal with a description or other representation of a current user action, a current dialogue state, and the determined user sentiment to a goal manager;

responsive to receiving the signal, determine, by the goal manager, a second goal from the updated dialogue policy based on the current user action, the current dialogue state, and the user sentiment;

select, at the goal manager subsystem of the dialogue manager software system, a second action based on the second goal; and perform, by the reinforcement learning-based dialogue agent, the second action.

16. The system of claim 15, wherein the first action includes determining and presenting, via a display, a first recommendation for a first product, the first user utterance indicates disappointment with the first recommendation, and the second action includes determining and presenting, via the display, a second recommendation for a second product.

17. The system of claim 16, wherein the instructions further cause the one or more computers to train the reinforcement learning-based dialogue agent with an agenda-based user simulator by generating messages by the agenda-based user simulator and passing the messages to the reinforcement learning-based dialogue agent.

18. The system of claim 17, wherein at least one message generated by the agenda-based user simulator includes an agenda-based user simulator goal and at least one message generated by the agenda-based user simulator includes feedback related to a reinforcement learning-based dialogue agent action.

19. The system of claim 15, wherein tracking the dialogue state for the conversation includes one or more of previous user action(s), previous user sentiment(s), previous user request(s), previous dialogue turns, previous rewards or penalties, and knowledge base status.

20. The system of claim 15, wherein training the reinforcement learning-based dialogue agent includes training the agent to perform actions based on optimizing the dialogue policy is to maximize a cumulative episodic reward.

* * * * *